US010290225B1

(12) United States Patent
Danyluk et al.

(10) Patent No.: US 10,290,225 B1
(45) Date of Patent: May 14, 2019

(54) DIRECTION INDICATORS

(71) Applicant: INTERNATIONAL BUSINESS MACHINES CORPORATION, Armonk, NY (US)

(72) Inventors: Nicholas George Danyluk, Long Island City, NY (US); Kavita Sehgal, Poughkeepsie, NY (US); Diane Marie Stamboni, Poughkeepsie, NY (US); Sneha Mary Varghese, Fishkill, NY (US); John S. Werner, Fishkill, NY (US); Sarah Wu, Kingston, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/843,046

(22) Filed: Dec. 15, 2017

(51) Int. Cl.
| | |
|---|---|
| *H04B 5/00* | (2006.01) |
| *G09B 17/00* | (2006.01) |
| *A61B 5/0476* | (2006.01) |
| *H04B 5/06* | (2006.01) |

(52) U.S. Cl.
CPC ........... *G09B 17/00* (2013.01); *H04B 5/0043* (2013.01); *A61B 5/0476* (2013.01); *H04B 5/06* (2013.01)

(58) Field of Classification Search
CPC .............................. G09B 17/00; H04B 5/0043
USPC ....................................................... 340/539.12
See application file for complete search history.

(56) References Cited

U.S. PATENT DOCUMENTS

| | | | |
|---|---|---|---|
| 6,644,976 B2 | 11/2003 | Kullok et al. | |
| 8,825,376 B1* | 9/2014 | Szybalski | G01C 21/3415 701/412 |
| 2012/0048014 A1* | 3/2012 | Loomis | B60R 11/0241 73/384 |
| 2012/0159691 A1 | 6/2012 | Phillippe | |
| 2013/0029685 A1* | 1/2013 | Moshfeghi | G01S 19/48 455/456.1 |
| 2016/0284235 A1* | 9/2016 | Zhang | G09B 21/003 |
| 2017/0146358 A1* | 5/2017 | Ward | G06F 3/016 |

* cited by examiner

*Primary Examiner* — Kerri L McNally
(74) *Attorney, Agent, or Firm* — Cantor Colburn LLP; Teddi Maranzano (57) ABSTRACT

A method includes arranging a first indicator device on a first portion of a user. The first indicator device corresponds to a first direction. The method includes analyzing environmental input from an input device to determine whether content associated with the first direction has been received. The method further includes outputting an indication to the user with the first indicator device responsive to determining that content associated with the first direction has been received.

16 Claims, 8 Drawing Sheets

DIRECTION INDICATORS

BACKGROUND

The present invention generally relates to assistance for impaired persons, and more specifically, to left and right indicators for impaired individuals.

Dyslexia, also known as reading disorder, is characterized by trouble with reading despite normal intelligence. The severity of this specific learning disability can differ in each individual but can affect reading fluency, decoding, reading comprehension, recall, writing, spelling, and sometimes speech, and can exist along with other related disorders. Dyslexia is also sometimes referred to as a Language-Based Learning Disability.

Dyslexia is believed to be caused by both genetic and environmental factors. The condition also may begin in adulthood as the result of a traumatic brain injury, stroke, or dementia. The underlying mechanisms of dyslexia are problems within the brain's language processing. Dyslexia is diagnosed through a series of tests of memory, spelling, vision, and reading skills.

SUMMARY

Embodiments of the present invention are directed to a method for indicating directions. A non-limiting example of the method includes arranging a first indicator device on a first portion of a user. Said first indicator device corresponds to a first direction. The method includes analyzing environmental input from an input device to determine whether content associated with said first direction has been received. The method further includes outputting an indication to said user with said first indicator device responsive to determining that content associated with said first direction has been received.

Embodiments of the present invention are directed to a system for indicating directions. A non-limiting example of the system includes a first indicator device arranged on a first portion of a user. Said first indicator device corresponds to a first direction. The system further includes a processor communicatively connected to said first indicator device. The processor is operative to analyze environmental input from an input device to determine whether content associated with said first direction has been received. The processor is also operative to output an indication to said user with said first indicator device responsive to determining that content associated with said first direction has been received.

Embodiments of the present invention are directed to a computer program product for indicating directions, the computer program product including a computer readable storage medium having program instructions embodied therewith. The program instructions are executable by a processor to cause the processor to perform a method. A non-limiting example of the method includes arranging a first indicator device on a first portion of a user. Said first indicator device corresponds to a first direction. The method includes analyzing environmental input from an input device to determine whether content associated with said first direction has been received. The method further includes outputting an indication to said user with said first indicator device responsive to determining that content associated with said first direction has been received.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, dyslexic individuals face challenges in everyday life due to not being able to distinguish right from left. These challenges can range from not being able to quickly react when given verbal directions while driving to missing instructions that include relative directions. For example, if an individual is given instructions a, b, c, and d, with instruction b being to hit the "left" button, the individual may be focused on figuring out which button is indeed the "left button, and instruction c may then be missed.

Although the left versus right confusion does not affect every person with dyslexia, it is a common problem. Dyslexic individuals struggle with connecting the meaning of a word to the word itself, not the concept of relative direction.

One of the challenges in assisting dyslexic individuals with left-right distinguishability is initial calibration of left and right indicators because the user cannot set left and right themselves. People with dyslexia are often told to make an "L" shaped sign with their thumb and forefinger to define "left," but this method is insufficient because the individuals may not be able to determine which direction the "L" should face, or whether to face their palms up or down when making the "L" sign. This method is also not possible when the hands of the individual are busy.

Turning now to an overview of the aspects of the invention, one or more embodiments of the invention address the above-described shortcomings of the prior art by providing a method to assist dyslexic adults, or children who have not yet learned left from right, in determining relative directions. The apparatus includes an environmental input device (for example, a microphone with speech analyzing software or a brain wave reader) and a wearable signaling indicator. When the environmental input device detects the terms/directions "left" or "right," the corresponding indicator (such as a bracelet) on the wrist of the user will signal the user (for example by vibrating) to indicate the proper direction. The environmental input device and indicators communicate with one another to help dyslexic adults and young children determine left from right. When a brain wave reader is used as the environmental input device, analysis of brain waves around the words "left" and "right" and the action of the user are also performed to determine the context of when and how the words are used and how the user reacts.

The above-described aspects of the invention address the shortcomings of the prior art by assisting a user in making a proper decision after hearing a spoken keyword ("left" or "right"). The methods, systems, and computer program products described herein help a user preemptively determine left or right directions by relaying such information to the user via wearable signaling indicators. The indicators eliminate the need for the user to look down, which could be dangerous when, for example, driving. Furthermore, the methods, systems, and computer program products can be used in any situation in which a user needs to determine left and right directions, and is not limited to the contexts of a predetermined destination in GPS directions, following a tutorial, or understanding spoken directions. The methods, systems, and computer program products are also operable to determine whether the wearable indicators are on the left or right sides, once they have been arranged on a user, which is helpful for dyslexic individuals who cannot distinguish left from right.

Figure 1:
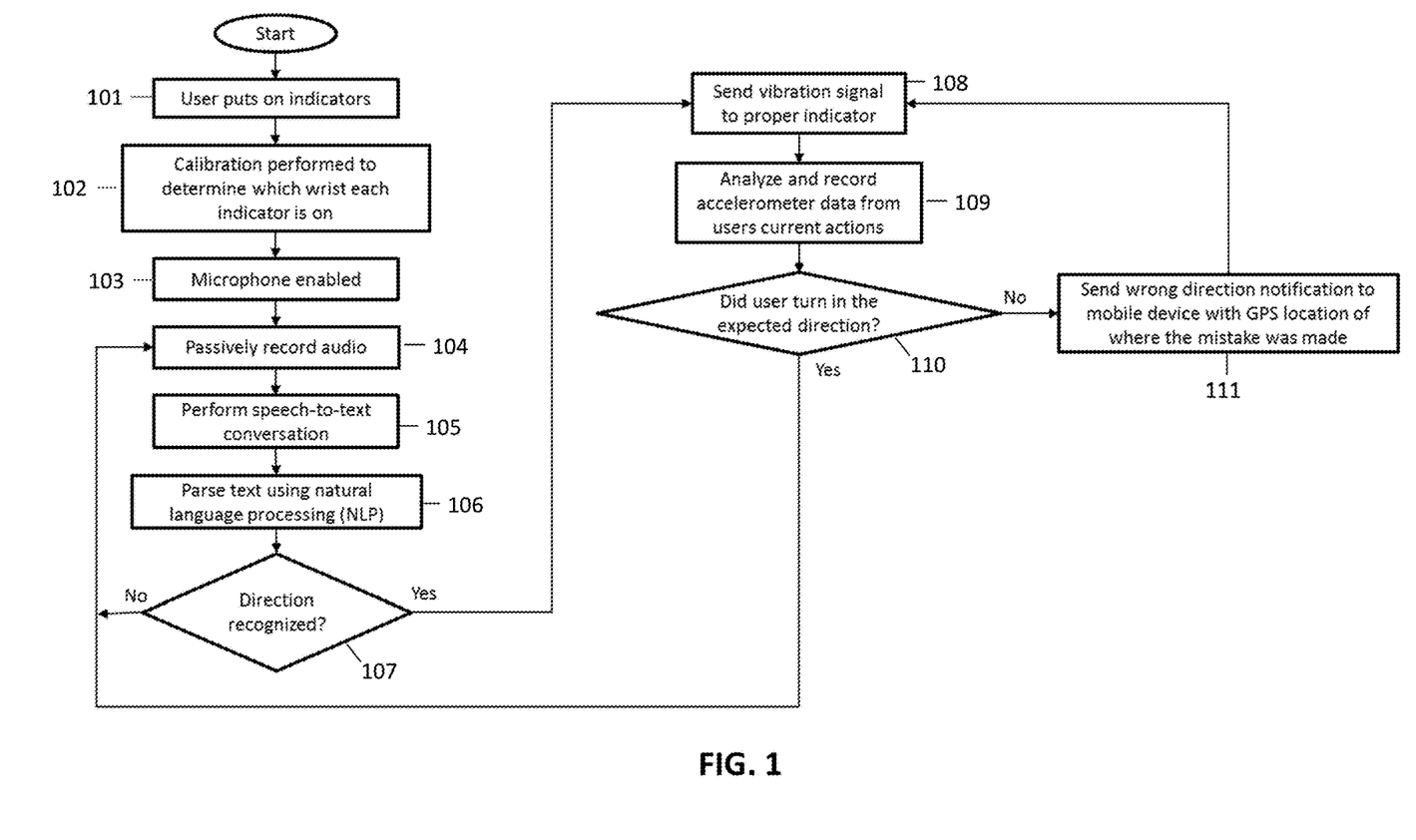
FIG. 1 depicts a flow chart illustrating a method according to embodiments of the invention.

Turning now to a more detailed description of aspects of the present invention, FIG. 1 depicts a flow chart illustrating a method according to embodiments of the invention, which implements a system that includes a microphone as the environmental input device. In box 101, the method includes the user putting on the wearable indicators.

According to one or more embodiments, the indicators are bracelets that are worn on a portion of the user, such as each of the left and/or right wrists. The user positions (arranges) a first indicator on a first portion of the user. According to one or more embodiments, the first portion of the user is a first appendage or proximate to a first wrist (right wrist). The user positions (arranges) a second indicator on a second portion of the user. According to one or more embodiments, the second portion of the user is a second appendage or a proximate to a second wrist (left wrist).

In box 102, the method includes performing calibration to determine which wrist, left or right, each indicator is on. Because the user is dyslexic and cannot be relied upon to put the correct indicator on the correct wrist (e.g., the "left" indicator on the "left" wrist), the method allows the user to put either indicator on either wrist. In order to properly function, the system itself determines which indicator is on the left or right wrist. However, the location of only one of the two indicators needs to be determined. Once one location is known (left or right), the other indicator can be assigned to the opposite side. Various methods for calibration are described below with reference to FIGS. 4-8.

The indicators are any type of device that can be worn on the left and right sides or appendages of the body of the user. The wearable indicators are worn on the left and right wrists as bracelets or watches, or any other type of device that may be attached or worn on the appendage of the user. The wearable indicators also can be worn on the fingers, for example as rings, or on the ankles as ankle bracelets.

In box 103, the method includes enabling a microphone. The microphone functions as the environmental input device that detects when spoken audible directions (left or right) are being referenced.

In box 104, the audio is passively recorded using a recording device. The recording device is also enabled when the microphone is enabled. Once initiated or turned "on," the microphone may operate in a constant listening mode, and the recording device may record audio during operation. The recording device receives the environmental input from the environmental input device. Though the audio may be recorded as an audio file, in some embodiments, the audio may be directly converted from speech to text for analysis and saving.

The microphone can be worn in the form of a wearable device such as a Bluetooth microphone, according to one or more embodiments. In other embodiments, the microphone could be present in the wearable indicators. In some embodiments, the microphone from the user's mobile device may be used.

Although the dyslexic user may not be able to distinguish left from right, upon hearing one of the terms, the user can at least repeat the term if the volume of the initial direction is not loud enough. For example, if the user is driving and receiving directions on her mobile phone, then upon being told to turn "left" or "right" on the mobile phone, the user can repeat the term so that the recording device records the speech.

After recording, the environmental input is analyzed by, for example, by performing speech-to-text conversion (box 105) and parsing the text using natural language processing (NLP) (box 106). Any application program interfaces (APIs) can be used that can convert passively recorded audio into text for analysis. Audio and voice are converted into written text for quick understanding of content, listening for left and right directions.

For NLP, any suitable API can be used that parses text to understand the converted audio and recognize spoken directions to feed/signal the indicators. NLP determines what is being spoken, listening for the words "left" and "right." NLP also can be used to determine the context of the spoken directions.

In box 107, the method includes determining whether the direction (left or right) is recognized ("yes") or not ("no"). If the direction is not recognized ("no"), then the steps in boxes 104 through 106 (passively recording audio, performing speech-to-text conversion, parsing text using NLP, respectively) are repeated for one or more iterations until the direction (left or right) is recognized by the system.

Thus, the environmental input is analyzed to determine whether content associated with a right direction (first direction) or a left direction (second direction) has been received.

In box 108, once the direction (left or right) is recognized, a signal (indication) is sent to the proper indicator (left or right). The indication is responsive to determining that content associated with the right direction (first direction) or left direction (second direction) has been received. The signal is a vibration according to one or more embodiments. The signal induces an action in the corresponding left or right indicator to help the user determine left from right. Although a vibrating signal enables the user to determine left from right without looking down at the indicators (which could be useful when performing a task such as driving), the signal sent to the indicator could be any other type of signal to help the user determine the proper direction. For example, the signal could be a light of one or more colors that are fixed or flashing.

In box 109, the method includes analyzing and recording the accelerometer data from the actions of the user following the output of the indication (signal) to the user. Accelerometers may be located within each of the indicators. Analyzing and recording accelerometer data is performed after sending the signal. The motion of the user is sensed following outputting the indication to the user.

In box 110, the method includes determining whether the user turns in the expected direction (whether the motion of the user was in the first (right) or second (left) direction following the sensing of the motion of the user). If the user turns in the expected direction (yes), then the method loops back to passively recording audio at box 104. If the user does not turn in the expected direction (no), then a wrong direction notification is sent to the mobile device of the user with the GPS location of where the mistake was made (a notification indicating a location where the motion of the user was not in the correct direction), as shown in box 111. The GPS on the mobile device of the user can then re-route the GPS directions to take into account the wrong turn. This step is an optional step that can be used when the user is using the system and method to follow GPS directions.

According to one or more embodiments, the methods described in boxes 109, 110, and 111 are optional, or only activated in situations where the user will react to audible directions. In some situations, the user may not physically move when hearing a direction. For example, a user may be looking at a picture when someone else mentions looking at an object on the right side of the picture. The right indicator may vibrate so the user knows where to look, but doesn't actually turn their body. In such a situation, the accelerometers mentioned in box 109 will not detect any movement, and the method may loop from box 108 back to box 104 (leaving out boxes 109-111).

Figure 2:
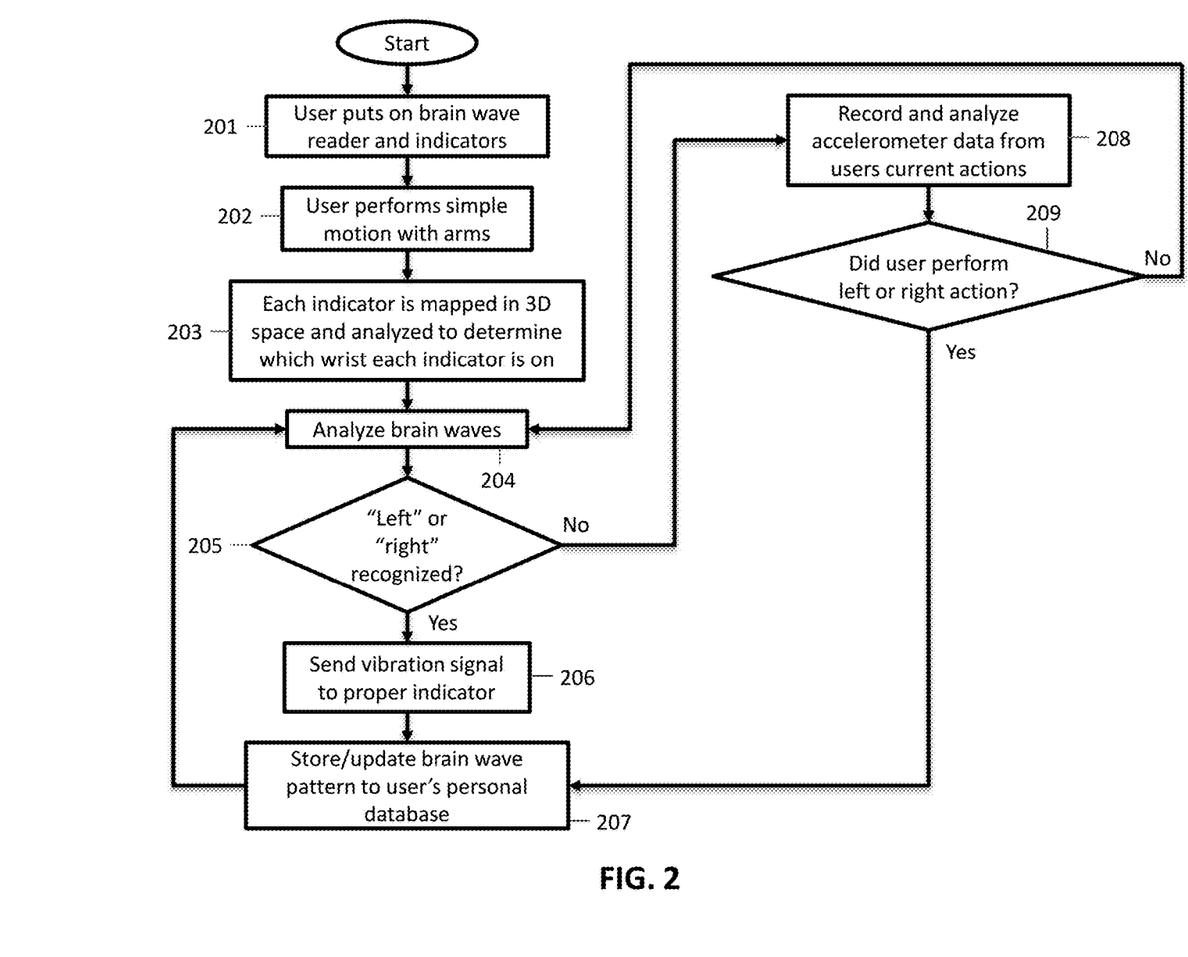
FIG. 2 depicts a flow chart illustrating a method according to embodiments of the invention.

FIG. 2 depicts a flow chart illustrating a method according to embodiments of the invention, which implements a brain wave scanner as the environmental input device. In box 201, the method includes putting on the brain wave reader and wearable indicators by the user. The system also includes a recording device, which may be present in the brain wave reader. The brain wave reader (environmental input device) is positioned on the head of the user, and the indicators are positioned on the wrists of the user, a left and right wrist (a first indicator on a first wrist and a second indicator on a second wrist). The brain wave reader can be in any wearable form, such as in the form of a hat, headband, or hair clip. The brain wave reader monitors for the thoughts or recognition of a user trying to decipher between "left" or "right" when placed on the user's head by monitoring the user's brain waves. According to one or more embodiments, the indicators are bracelets that are worn on each of the left and right wrists. The brain wave reader is configured to communicate with the indicators via, for example, a wireless or wired communicative connection.

In box 202, the method includes the user performing simple arm motion. In box 203, each indicator is mapped in 3D space and analyzed to determine which wrist (or appendage) each indicator is arranged on. The steps in boxes 202 and 203 are calibration steps to determine which wrist, left or right, each indicator is on. Because the user is dyslexic and cannot be relied upon to put the correct indicator on the correct wrist (e.g., the "left" indicator on the "left" wrist), the device allows the user to put either indicator on either wrist. In order to properly function, the device itself should be able to determine which indicator is on the left or right wrist. However, the location of only one of the two indicators needs to be determined. Once one location is known, the other indicator can be assigned to the opposite side. According to some embodiments, different methods of calibration other than what is described in boxes 202 and 203 may be used. These steps for calibration are described in further detail below with reference to FIGS. 4-8.

The wearable indicators are any type of devices that can be worn on the left and right sides or appendages of the body of the user. The wearable indicators may be worn on the left and right wrists as bracelets or watches according to one or more embodiments. The wearable indicators also can be worn on the fingers, for example as rings, or on the ankles as ankle bracelets. A combination of devices may be worn to better conceal the indicators as long as one device is on the left side and one is on the rights side (e.g., a watch on the left wrist and a ring on one of the fingers of the right hand).

In box 204, the method includes analyzing brain waves, which are the environmental input. The brain waves may be recorded on a recording device and used to learn patterns specific to the user. In box 205, the method includes determining whether the terms "left" or "right" or some version thereof are recognized.

According to one or more embodiments, the brain wave reading device recognizes a word (left or right) when a person thinks about the word, without speaking the word. Because different syllables produce different brain wave patterns, the terms "left" and "right" produce different brain wave patterns. Brain wave reading devices recognize different wave patterns and relate them to different words, making it possible to recognize a word, left or right, when a person hears or thinks the words, left or right.

According to an exemplary embodiment, the brain wave reading device is a portable single-channel EEG recording device, such as iBrain™, commercially available from NeuroVigil, Inc. The iBrain™ device is a miniature electronics box attached to a light and flexible elastic head harness and electrodes that can be worn on the user's head.

In box 206, the method includes, if left or right is recognized, sending a vibration signal to the proper indicator (left or right). The method may then store and/or update the existing brain wave pattern on the user's personal database at box 207 to enhance the recognition system and ensure that any changes over time may be accounted for, for example, as the user ages. The personal database is created for the user, which maps brainwave patterns to words. The brain wave signals before and after the words "left" and "right" are stored in the database, along with the user's actions after recognizing the keyword.

If left or right is not recognized, the method includes, in box 208, the method includes recording and analyzing accelerometer data from the user's current actions. At box 209, if analysis shows that the user performed a left or right action the method may move back to box 207 to store and/or update the existing brain wave pattern on the user's personal database. The left or right action may be indicated via the accelerometer data or further analysis of the brain waves (e.g., the user looked left or right). The feedback data from the analysis may help the system learn the user's personal brain wave patterns to enhance direction recognition in the future. If analysis shows that the user did not perform a left or right action at 209, the method may loop back to box 204 to continue monitoring and analyzing the user's brain waves. The accelerometer and brain wave data that was analyzed may be stored for future reference in brain wave comparisons indicating that a left or right direction was not detected, or it may be discarded to minimize storage space.

The vibrating signal induces an action in the corresponding left or right indicator to help the user determine left from right. Although a vibrating signal enables the user to determine left from right without looking down at the indicators (which would be useful when performing a task such as driving), the signal sent to the indicator could be any other type of signal to help the user determine the proper direction. For example, the signal could be a light of one or more colors that are fixed or flashing.

Figure 3A:
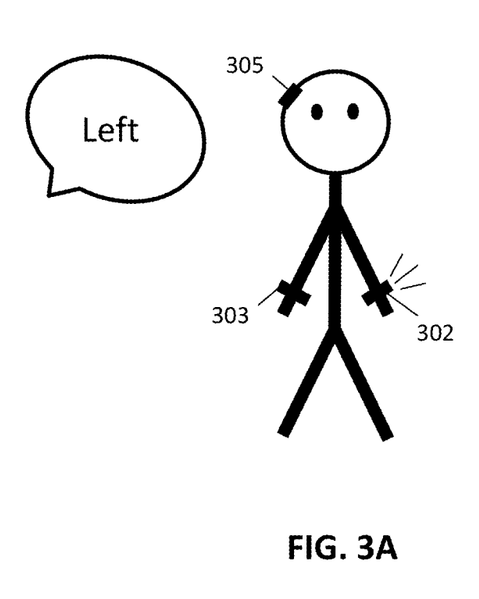
FIG. 3A depicts a system recognizing audible words and signaling the appropriate indicator according to embodiments of the invention.
Figure 3B:
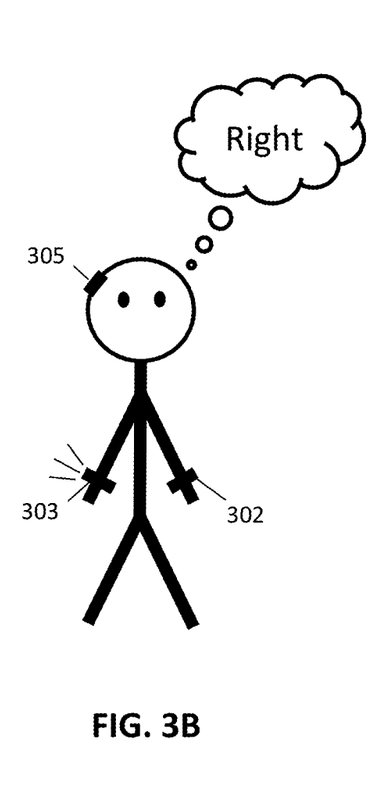
FIG. 3B depicts a system analyzing brain waves in response to audible words according to embodiments of the invention.

FIG. 3A depicts the system for recognizing audible words and signaling the appropriate indicator according to embodiments of the invention. FIG. 3B depicts the system analyzing brain wave signals in response to audible words according to embodiments of the invention.

The device includes a brain wave reader 305 (environmental input device), a first indicator 302, and a second indicator 303. The brain wave reader 305 may be worn on the head of the user. The first indicator 302 is worn on the left wrist, and the second indicator 303 is worn on the right wrist. The relative positioning of each indicator does not matter, as a calibration is performed before using the device to determine the relative positions of the indicators. The left indicator 302 shown in FIGS. 3A and 3B is worn on the left wrist of the user.

Brain waves are constantly being processed for recognition of the words "left" and "right". When a person hears the term "left" (as shown in FIG. 3A) or "right," the word is interpreted by their brain generating brain waves which are analyzed such that the appropriate indicator (the first indicator 302, shown in FIG. 3A) mapped to that direction will vibrate, indicating the correct direction to the user.

The brain wave signals before and after the words "left" or "right" are also stored, along with the actions of the user after recognizing the keyword. When a user thinks about the term "right" (as shown in FIG. 3B) or "left," the appropriate indicator (the second indicator 303, shown in FIG. 3B) mapped to that direction will vibrate, indicating the correct direction to the user.

Accelerometer data in the indicators or the mobile device of the user could be mapped to determine if the user turned in the expected direction. Based on the actions of the user, a personal database can be updated that will compare brain wave signals before and after the words "left" and "right" to better understand context and improve accuracy.

Figure 4:
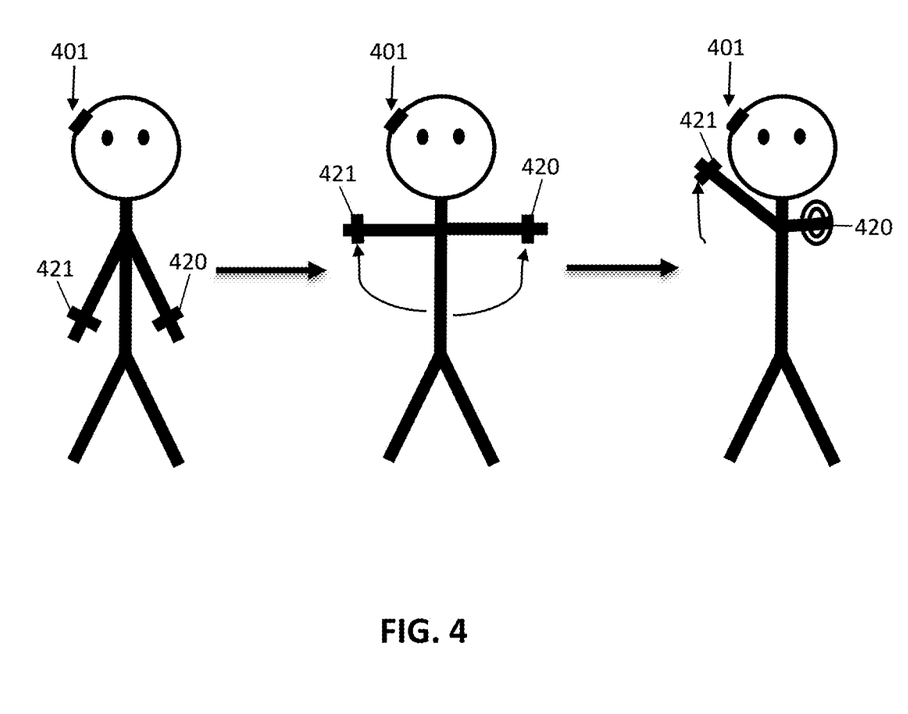
FIG. 4 depicts a method for calibrating a system using Inertial Measurement Units (IMUs) according to embodiments of the invention.

FIG. 4 depicts a method for calibrating the device using Inertial Measurement Units (IMUs) according to embodiments of the invention. IMUs are devices that measure and report positioning of a body using a combination of accelerometers and gyroscopes. The IMUs are incorporated into the indicators themselves. IMU devices are used in, for example, aircrafts and robots (with GPS and other instruments). IMUs track the direction, force, and orientation of each device. The IMUs are only needed after initial powering "on" of the device. After activation, they can be powered "off" to save energy.

To ensure the wearable indicators, such as bracelets, can differentiate left from right, a calibration sequence is run using the IMUs. The user puts on the brain wave scanner 401, the first indicator 420 on a first wrist, and the second indicator 421 on the second wrist. It does not matter which wrist which indicator is put on because the calibration performed will determine the relative positioning of the indicators. Thus, prior to the calibration process, the first and second indicators 420 and 421 are substantially similar and interchangeable.

Initial calibration of the wearable indicators is performed using a pre-programmed series of arm motions/gestures that the user is told to repeat on initial device start-up. The pre-programmed gestures can be, for example, raising one arm and not the other, raising both arms forward parallel to the ground, then rotating the arms out to the side, etc. Then each indicator is mapped in three-dimensional space to determine which wrist the left indicator is on and which wrist the right indicator is on as well as left direction, right direction, vertical direction, and forward facing direction.

It is noted that if the indicators with the IMUs are removed after a calibration is performed, the calibration should be performed again before the user can use the system again. In other words, removing the system with IMUs acts as a switch, forcing the IMU to re-determine right and left before the device can be used again.

According to one or more embodiments, the calibration sequence includes the sequence shown in FIG. 4. The user starts with both hands and arms by their sides. The user wears one of each of the indicators, first indicator 420 on a first wrist and second indicator 421 on a second wrist, left and right arms, respectively. A prompt or indicator may instruct the user to begin the sequence. The user raises both arms in an arcing motion until they form a straight line perpendicular to the body of the user. The user then continues raising one arm (following the same arc) until the arm is raised above the head of the user or as high as is comfortable (see arm with second indicator 421 in FIG. 4). The other arm with first indicator 420 changes directions and is extended in front of the user in a separate, orthogonal arcing motion. The first and second indicators 420 and 421 use IMUs to track the rotation and position of the indicators and match the data to a curve corresponding to a direction.

Figure 5:
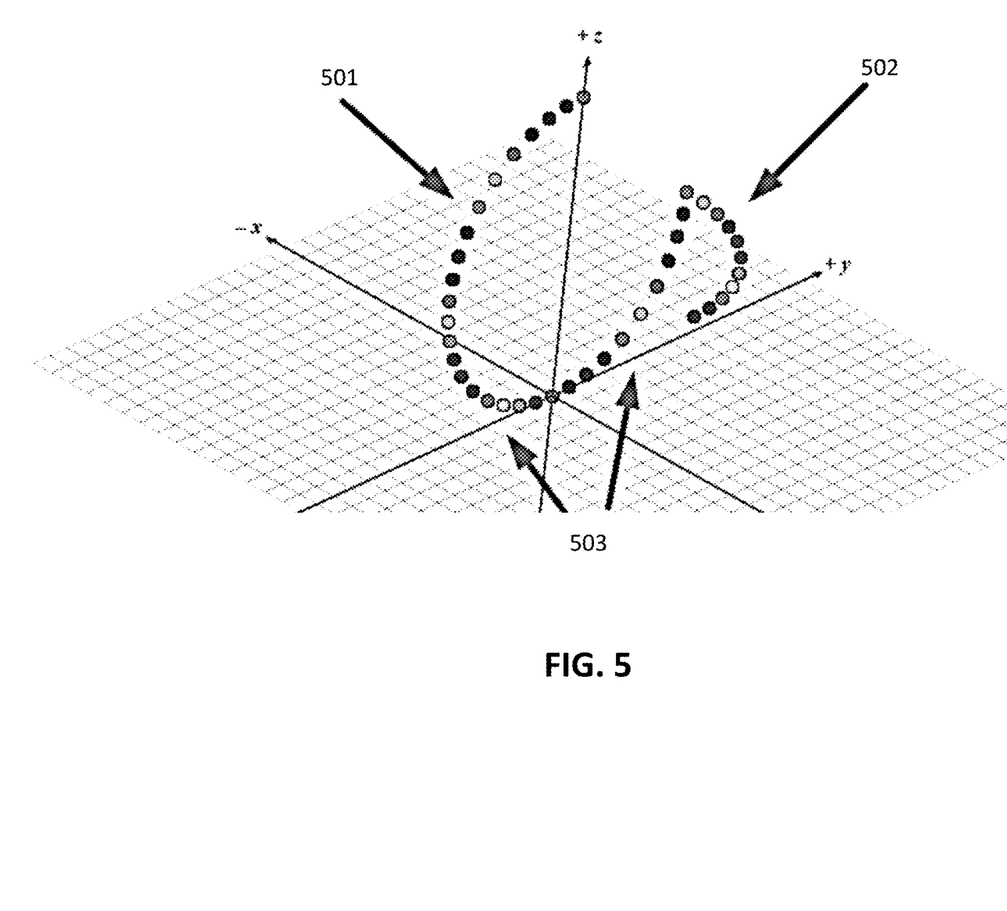
FIG. 5 depicts a graph of data gathered during calibration using IMUs according to embodiments of the invention.
Figure 6:
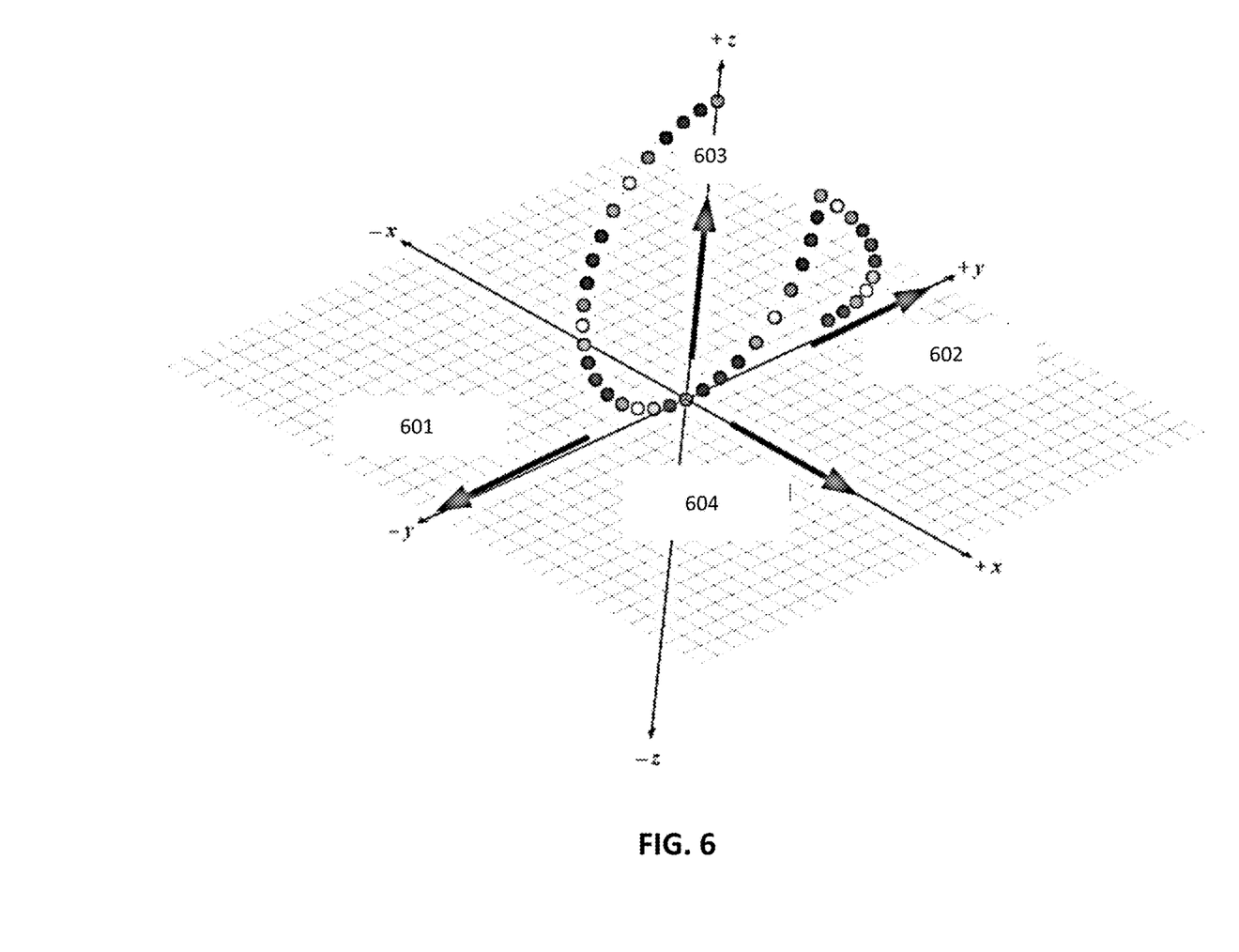
FIG. 6 depicts a graph of data gathered during calibration using IMUs according to embodiments of the invention.

FIG. 5 and FIG. 6 depict graphs of data gathered during device calibration using IMUs according to embodiments of the invention. The sequence of circles are plotted in three-dimensional space on x, y, and z planes and represent the data points gathered by the IMUs.

As shown in FIG. 5, one IMU 501 (in one indicator) follows the original path of the arm of the user to completion, such as raising one arm above the head (the right arm with the second indicator 421 in FIG. 4). This motion would be a "full arc." Another IMU 502 (in another indicator) follows an orthogonal path (moving one arm in front of the user) to establish the subject's direction (partial raise of the left arm with the first indicator 420 in FIG. 4). This motion would be a partial arc with a 90° change in direction. Both IMUs 503 follow an initial symmetrical path, when the user raises both arms evenly, to establish the vertical direction. Because the user has trouble determining left from right, they cannot be told which arm goes in the full arc and which arm will move forward. The method will be able to determine which wrist each indicator is on regardless of which arm the user uses to move in a full arc and which arm moves forward. FIG. 5 shows the right arm being raised up and the left arm moving forward. If the user happened to perform the motions with the reversed arms, the plot would be mirrored through the xz plane.

The resulting distinct patterns generated using IMUs are distinguishable from each other depending on whether the user had the wearable indicators on their left or right wrists. The IMUs do not need to be synchronized for this technique to work. The output from each bracelet, as shown in FIG. 6, would be either "control" (full arc), left direction 602 (partial arc with a change in direction after reaching 90 degrees), or right direction 601 (mirror image of left direction dataset). The left direction 602 is determined because most users would not be able to bend their right arm straight back along this path if they happened to be facing the opposite direction. The forward direction 604 and vertical direction 603 are also determined. This output assumes a starting point of a lowered wrist ending with the wrist above the head of a user or extended in front of the user. The sequence can be run multiple times to ensure the device is accurately reading the data.

In other embodiments, a user may not perform the calibration sequence. Instead, the wearable indicators could track movement over the first moments of use to determine left from right.

Figure 7:
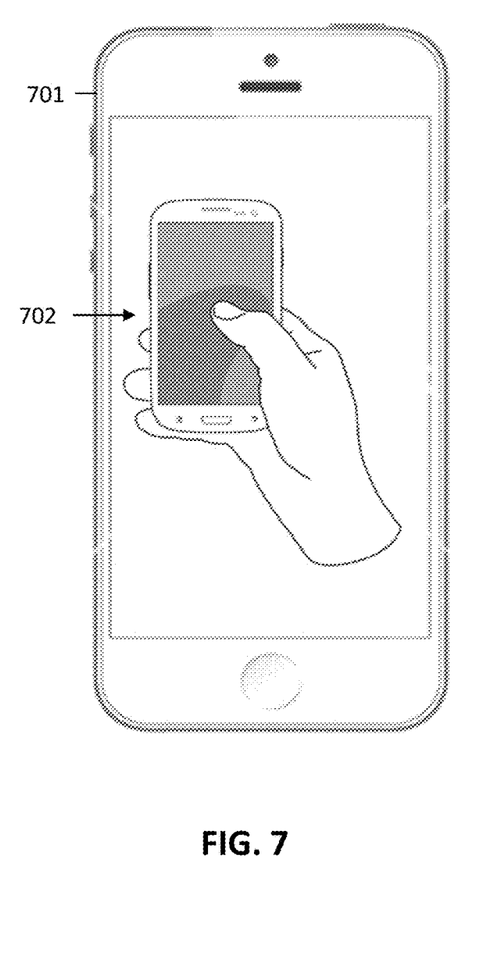
FIG. 7 depicts a method for calibrating the system using passive near field communication (NFC) according to embodiments of the invention.

FIG. 7 depicts a method for calibrating the system using passive near field communication (NFC) according to embodiments of the invention. A mobile device is used for initial set-up of the apparatus.

Most modern mobile devices include NFC. NFC operates at a frequency of 13.56 MHz and has a read distance of ~20 cm. Although NFC is described, it is to be understood that any wireless transmission protocol may be used to perform the method discussed in FIG. 7 and FIG. 8. The user puts one indicator on each wrist, a first indicator on a first wrist and a second indicator on a second wrist. Each indicator is equipped with passive NFC. Initially, it does not matter which wrist the indicators are put on. The mobile device 701 of the user then displays an image 702 that clearly shows which hand to hold the mobile device with. In this example shown in FIG. 7, the image 702 shows the right hand holding the mobile device. The alternative image would show the left hand holding the mobile device. The user could also be told to hold their other hand out away from the mobile device. The mobile device then transmits at 13.56 MHz to power up any passive NFC tag within range. Ideally, only one NFC tag would be in range of the device, the NFC tag present in the indicator holding the mobile device. The mobile device knows which hand it was supposed to be held in from the image that was displayed so it can now determine which bracelet is on which hand. The indicator on the hand with the mobile device could vibrate to signal the user that calibration is complete.

According to one or more embodiments, a fingerprint scanner on the mobile device could be used to calibrate the device and determine which hand the user is holding the device with.

The calibration may also be performed in some alternate exemplary embodiments, using a camera and visual recognition techniques to identify the location of the indicator on the user.

Though the illustrated exemplary embodiment of FIG. 7 includes the mobile device 701, the exemplary embodiments described herein may, however, include any type of processing device. For example the mobile device 701 of the user may include any suitable processing device, such as, for example a smart phone, mobile computer, personal computer, smart watch, or any other device that includes a processor, and is operative to communicate with an environmental input device (e.g., microphone or brain wave scanner). The processor of the mobile device 701 of the user in the exemplary embodiment, for example, is communicatively connected to a GPS receiver, a touchscreen, a speaker, a microphone, and the indicators 302 and 303 (as shown in FIG. 3), and may be connected to a network to communicate via the Internet.

The indicators 302 and 303 may include any device operative to communicatively connect to the mobile device 701 of the user wirelessly, or via a wired connection and output signals to the user. The indicators 302 and 303 may include, for example, a motor or piezoelectric device that is operative to induce a vibratory signal or haptic sensation when worn on the user. The indicators 302 and 303 may also include a speaker or other output device operative to output an audible signal including a voice signal as well as a visual indicator such as a light or a display screen. The indicators 302 and 303 may also include a motion sensing device, such as an accelerometer or other inertial or motion sensor. In some embodiments, the indicators 302 and 303 may include a smartphone or smart watch.

Figure 8:
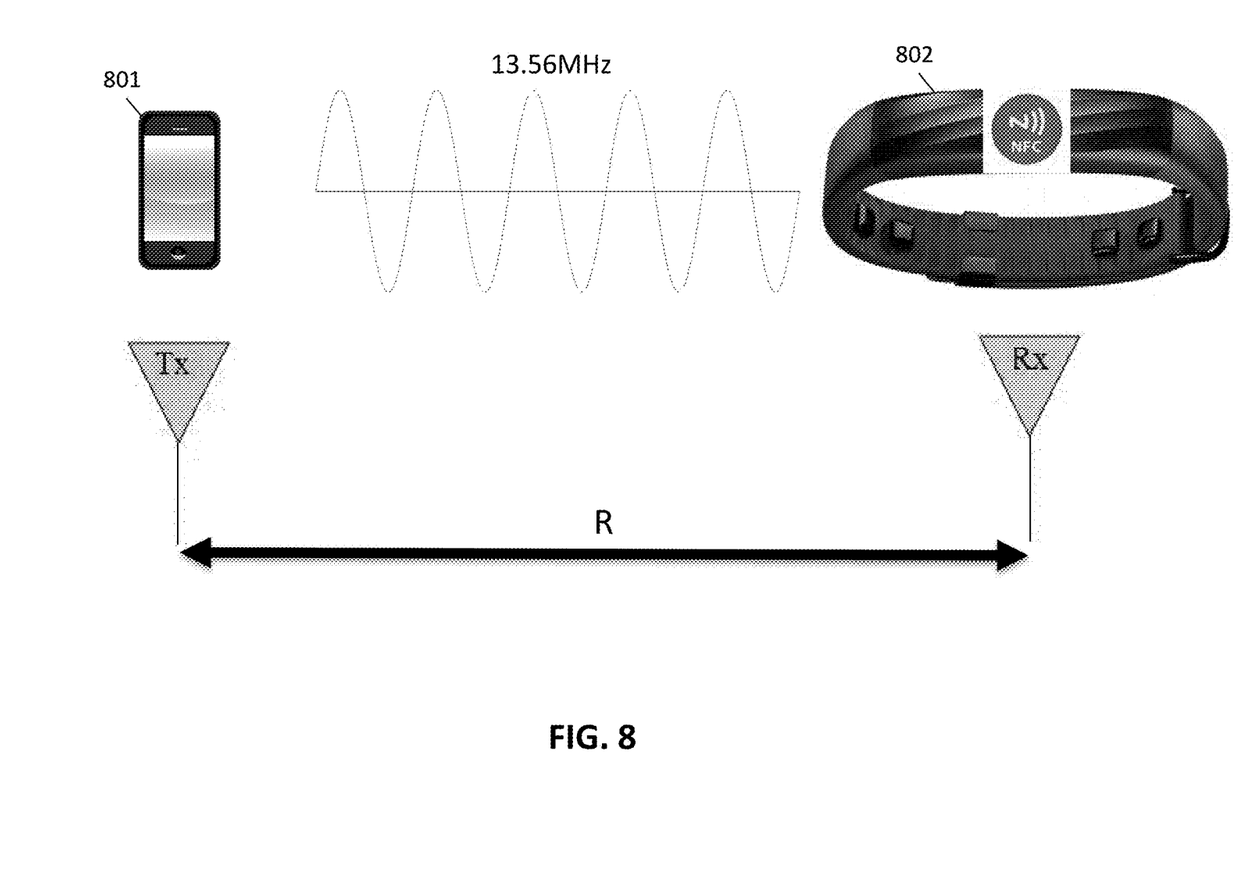
FIG. 8 depicts a method for calibrating the system using passive NFC according to embodiments of the invention.

FIG. 8 depicts an exemplary method for calibrating the system using passive NFC on an indicator 802 and a mobile device 801 according to embodiments of the invention. If two indicators were detected within NFC range, Friis Transmission Equation (Eq. 1) could be used to determine the closer indicator, which will most likely be the one on the hand holding the mobile device. Because the indicators have their own power source, the mobile device may not be necessary while the indicators are in use. There is no need to worry about a lost mobile device or dead battery affecting the performance of the indicators.

$$R = \frac{\lambda}{4\pi \sqrt{\frac{P_t}{P_r G_t G_r}}} \qquad \text{Eq. 1}$$

Eq. 2 shows the equation for the wavelength $\lambda$, of NFC, which is 22.12 m. In Friis equation (Eq. 1), the following variables are used. $P_t$=Power transmitted by the mobile device. $P_r$=power received by the NFC indicator; $G_t$=gain of transmitting antenna of the mobile device; $G_r$=gain of receiving antenna of the NFC indicator; R=distance between the mobile device and NFC indicator; c=speed of light; and f=frequency (13.56 MHz for NFC).

$$\lambda = \frac{c}{f} = \frac{2.99 * 10^8 \frac{m}{s}}{13.56 * 10^6 \text{ Hz}} = 22.12 \text{ m} \qquad \text{Eq. 2}$$

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for indicating directions, the method comprising:
   arranging a first indicator device on a first portion of a user, the first indicator device corresponding to a first direction;
   analyzing environmental input from an input device to determine whether content associated with the first direction has been received, the environmental input including brain waves; and
   outputting an indication to the user with the first indicator device responsive to determining that content associated with the first direction has been received.

2. The method of claim 1, further comprising:
   arranging a second indicator device on a second portion of the user, the second indicator device corresponding to a second direction;
   analyzing the environmental input from the input device to determine whether content associated with the second direction has been received; and
   outputting an indication to the user with the second indicator device responsive to determining that content associated with the second direction has been received.

3. The method of claim 1, wherein the first portion of the user is proximate to a right wrist of the user.

4. The method of claim 2, wherein the second portion of the user is proximate to a left wrist of the user.

5. The method of claim 1, further comprising:
   sensing motion of the user following outputting the indication to the user;
   determining whether the motion of the user was in the first direction following the sensing of the motion of the user; and
   sending a notification indicating a location where the motion of the user was not in the first direction following the sensing of the motion of the user.

6. The method of claim 1, further comprising calibrating the first indicator device using inertial measurement units (IMUs).

7. The method of claim 1, further comprising calibrating the first indicator device using near field communication (NFC) and a mobile device.

8. A system for indicating directions, the system comprising:
   a first indicator device arranged on a first portion of a user, the first indicator device corresponding to a first direction; and
   a processor communicatively connected to the first indicator device, the processor operative to:
     analyze environmental input from an input device to determine whether content associated with the first direction has been received, the environmental input including brain waves; and
     output an indication to the user with the first indicator device responsive to determining that content associated with the first direction has been received.

9. The system of claim 8, further comprising:
   a second indicator device on a second portion of the user, the second indicator device corresponding to a second direction; and
   wherein the processor is communicatively connected to the second indicator device, and the processor is further operative to:
     analyze the environmental input from the input device to determine whether content associated with the second direction has been received; and
     output an indication to the user with the second indicator device responsive to determining that content associated with the second direction has been received.

10. The system of claim 8, wherein the first portion of the user is proximate to a right wrist of the user.

11. The system of claim 9, wherein the second portion of the user is proximate to a left wrist of the user.

12. The system of claim 8, wherein the processor is operative to calibrate the first indicator device using inertial measurement units (IMUs).

13. The system of claim 8, wherein the processor is operative to calibrate the first indicator device using near field communication (NFC) and a mobile device.

14. A computer program product comprising a computer readable storage medium having program instructions embodied therewith, the program instructions executable by a processor to cause the processor to perform a method comprising:
  arranging a first indicator device on a first portion of a user, the first indicator device corresponding to a first direction;
  analyzing environmental input from an input device to determine whether content associated with the first direction has been received, the environmental input including brain waves; and
  outputting an indication to the user with the first indicator device responsive to determining that content associated with the first direction has been received.

15. The computer program product of claim 14, wherein the method further comprises:
  arranging a second indicator device on a second portion of the user, the second indicator device corresponding to a second direction;
  analyzing the environmental input from the input device to determine whether content associated with the second direction has been received; and
  outputting an indication to the user with the second indicator device responsive to determining that content associated with the second direction has been received.

16. The computer program product of claim 14, wherein the first portion of the user is proximate to a right wrist of the user.

* * * * *